United States Patent Office 3,642,843
Patented Feb. 15, 1972

3,642,843
METHOD OF PRODUCING UNSATURATED NITRILE AND ESTER COMPOUNDS
Joseph W. Nemec, Rydal, and Donald R. Hoffer, Glenside, Pa., assignors to Rohm & Haas Company, Philadelphia, Pa.
No Drawing. Continuation-in-part of abandoned application Ser. No. 183,753, Mar. 30, 1962. This application Sept. 26, 1966, Ser. No. 581,726
Int. Cl. C07c 64/52, 121/02, 121/30
U.S. Cl. 260—405.5    4 Claims

ABSTRACT OF THE DISCLOSURE

A method of producing unsaturated compounds which comprises heating certain nitroalkanes and substituted nitroalkanes at about 200° to 240° C. in a batch process or at about 300° to 600° C. in a continuous vapor phase process.

---

This application is a continuation-in-part of application Ser. No. 183,753, filed Mar. 30, 1962, now abandoned.

This invention deals with a novel method for the preparation of specific unsaturated compounds.

The specific unsaturated compounds prepared by the thermal decomposition method of this invention may be represented by the formula $$R-\underset{\underset{R}{|}}{C}=CHR'$$

These specific unsaturated compounds are prepared by the thermal decomposition of a compound having the formula $$R-\underset{\underset{R}{|}}{\overset{\overset{R'}{|}}{\underset{CH_2}{|}}{C}}-NO_2$$

In the above formulas, the symbols have the following definitions:

R is an alkyl group of 1 to 4 carbon atoms or a group of one of the formulas $$-CH_2CH_2T \text{ and } -CH_2CH(T)CH_3$$

in which T is one of the groups

—CN
—CONQ$_2$
—COY or

—COOY in which

Q is hydrogen or alkyl of 1 to 4 carbon atoms and
Y is alkyl of 1 to 12 carbon atoms.

The symbol

R' is essentially the same as the R symbol minus the group

—CH$_2$—

R' may represent hydrogen or alkyl of 1 to 3 carbon atoms or the group $$-\underset{\underset{X}{|}}{CHT}-$$

in which

X and T represent the groups described under the symbol R. It is preferred that within the symbols R and R' there be at least two T groups.

Typical embodiments of R include methyl, isopropyl, butyl, methoxycarbonyl ethyl, ethoxycarbonyl ethyl, butoxycarbonyl ethyl, dodecylcarbonyl ethyl, 2-methylcarbonyl-2-methyl ethyl, 2-butylcarbonyl-2-methyl ethyl, 2-octylcarbonyl-2-methyl ethyl, 2-dodecyloxycarbonyl-2-methyl ethyl, 2-cyano-2-methyl ethyl, aminocarbonyl ethyl, 2-N-methylaminocarbonyl ethyl, 2-N,N-diethylaminocarbonyl ethyl, 2-aminocarbonyl-2-methyl ethyl and 2-N,N-dibutylaminocarbonyl-2-methyl ethyl.

Typical embodiments of the nitro compound include methyl γ-nitro isocaproate, ethyl γ-nitro isocaproate, butyl γ-nitro isocaproate, methyl α-methyl-γ-nitro isocaproate, ethyl α-methyl-γ-nitro isocaproate, methyl γ-nitro-γ-methylhexoate, ethyl γ-nitro-γ-ethylhexoate, ethyl γ-nitro-α,γ-dimethylhexoate, dimethyl γ-nitro-γ-methylpimelate, diethyl γ-nitro-γ-methylpimelate, dipropyl γ-nitro-γ-methylpimelate, dimethyl γ-nitro-γ-propylpimelate, diethyl γ-nitro-γ-propylpimelate, dipropyl γ-nitro-γ-propylpimelate, dimethyl α,α,γ-trimethyl γ-nitropimelate, diethyl α,α,γ-trimethyl γ-nitropimelate, dibutyl α,α,γ-trimethyl γ-nitropimelate, tris(2-methoxycarbonylethyl)nitromethane, tris(2-butoxycarbonylethyl)nitromethane, 2-nitro-2-methylpropane, 2-nitro-2-ethylpropane, 2-nitro-2-ethylhexane, 2-nitro-2-butyloctane, 2-nitro-2-(2-cyanoethyl)propane, 2-nitro-2-(2-cyano-2-methylethyl)hexane, 2-nitro-2-(2-carbamoylethyl)propane, 2-nitro-2-(2-carbamoyl-2-methylethyl)hexane, 1-nitro-1,1-bis(2-cyanoethyl)butane, 1-nitro-1,1-bis(2-methyl-2-cyano-2-methylethyl)pentane, 1-nitro-1,1-bis(2-carbamoylethyl)butane, 1-nitro-1,1-bis(2-methyl-2-carbamoyl-2-methylethyl)pentane, tris(2-cyanoethyl)nitromethane, tris-(2-cyano-2-methylethyl)nitromethane, tris(2-carbamoylethyl)nitromethane, tris(2-carbamoyl-2-methylethyl)nitromethane, 2-methyl-2-nitro-5-hexanone, 2-methyl-2-nitro-5-heptanone and 3-methyl-3-nitro-6-octanone.

The preferred starting material nitro compounds are those in which no more than two of the radicals —R and —CH$_2$R' are alkyl, and if more than one —R and —CH$_2$R' group other than alkyl is present, they are identical.

As may be noted from the specific radicals and compounds named above, the examples, and the formula for the nitro compound, said —R and —CH$_2$R' groups other than alkyl are 2-cyanoethyl; 2-cyano-2-methylethyl; 2-alkoxycarbonylethyl or 2-alkoxycarbonyl-2-methylethyl, the alkoxy group of which contains 1 to 12 carbon atoms; 2-carbamoylethyl or 2-carbamoyl-2-methylethyl; 2-alkylcarbamoylethyl or 2-alkylcarbamoyl-2-methylethyl, and the alkyl group of which contains 1 to 4 carbon atoms; 2-alkylcarbonylethyl or 2-alkylcarbonyl-2-methylethyl having from 1 to 12 carbon atoms in the alkyl group.

The present reaction is conducted by heating the nitro reactant, previously defined, in a temperature range of about 200° to 240° C., preferably 210° to 225° C., at atmospheric pressure. Oxides of nitrogen, along with water, are evolved and the reaction is preferably continued until this evolution substantially ceases. If the product boils at a temperature below the reaction temperature range, then it may be distilled over as the reaction progresses. It is possible, and frequently advantageous, when the product boils below the reaction temperature range to employ an inert material that boils above the reaction temperature range in order to expedite the removal of the product from the medium. Suitable in this respect are tricresylphosphate, dialkyl phthalates (dimethyl, diethyl, dibutyl), triphenyl phosphate and diethylene glycol.

When products are obtained that boil above the reaction temperature range (200° to 240° C.), the reaction is continued until the evolution of the oxides of nitrogen and water ceases and then the product is removed under reduced pressure. These modifications will be clear to one skilled in the art from the teaching of this invention.

In the batch procedure, described above, it is preferred to adhere closely to the stated temperature range since little or no substantial reaction occurs below 200° C. Above 240° C., undesired degradations occur in some instances. It is possible to conduct the present reaction on a continuous vapor phase basis at 300° to 600° C. at atmospheric, but preferably reduced, pressure with contact times of about ½ to 2 minutes, preferably ¾ to 1½ minutes.

If a continuous process is contemplated, it is frequently advantageous to add the starting material to a pre-heated reaction system containing an inert high boiling compound, such as tricresylphosphate. The product then can be continuously removed substantially as soon as it is formed.

The compounds prepared by the method of the present invention are useful as plasticizers, particularly for polyvinyl chloride when employed in the usual amounts in the usual commercial formulations. The compounds in which there are at least two T groups are particularly useful as synthetic lubricants. In this respect, they exhibit good pour points and good viscosity indexes.

The compounds prepared by the method of the present invention are also useful chemical intermediates. Particularly useful are those of the structure

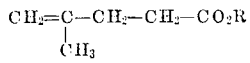

which are readily converted to lactones when treated with acids.

EXAMPLE 1

The reactor is a 1" x 30" glass tube packed with glass helices enclosed in a horizontal furnace and fitted at the upper end with an addition funnel and at the lower end with a cooled receiver connected to a vacuum pump. The system is heated to 500°±20° C. and the pressure is maintained in the range of 240 to 280 mm. absolute pressure. There is added 175 grams of methyl 4-methyl-4-nitropentanoate at about a constant rate over a period of one hour.

The reactor effluent is transferred to a separatory funnel and the aqueous layer is removed. The organic layer is distilled under reduced pressure to give as the main fraction 89 grams of methyl 4-methyl-4-pentenoate which distills at 39° to 44° C. at 6 mm. absolute pressure. The product has an $n_D^{24.5}$ value of 1.4257, contains 65.83% carbon (65.59% theoretical) and 9.56% hydrogen (9.44% theoretical).

The product is identified as methyl 4-methyl-4-pentenoate.

EXAMPLE 2

Methyl 2,4-dimethyl-4-nitropentanoate (189 grams) is added to a reactor containing 50 grams of tricresyl phosphate which has been preheated to 204° C. The reactor is externally heated and is fitted with a short column and a distillation head. The material is added over a period of one hour during which time the reactor temperature is maintained in the range of 198° to 204° C. The mixture is then heated to 220° C. and distillate is taken overhead. Distillation is continued for a period of three hours; the reactor and vapor temperature ranges are 215° to 235° C. and 160° to 175° C., respectively. Brown fumes are evolved from the system during the run.

The distillate consists of two layers. The bottom aqueous layer is discarded and the organic layer is distilled to give 86 grams of methyl 2,4-dimethyl-4-pentenoate which distills at 57° to 60° C. at 12 mm. absolute pressure. The product has an $n_D^{25}$ value of 1.4267, contains 67.82% carbon (67.57% theoretical) and 9.77% hydrogen (9.93% theoretical).

The product is identified as methyl 2,4-dimethyl-4-pentenoate.

EXAMPLE 3

To a reactor equipped with an agitator, thermometer and distillation column and head is charged 580 grams of sec-butyl 4-methyl-4-nitro pentanoate. The agitated material is heated to about 220° C. to effect a smooth conversion to the product. The reactor is maintained in the range of 206° to 231° C. for a period of ten hours during which time oxides of nitrogen are evolved and distillate is collected overhead. At the end of this time, the reactor is essentially free of liquid.

The distillate is transferred to a separating funnel and the aqueous layer (45 grams) is removed. The organic layer is fractionated under reduced pressure to give as the main fraction 260 grams of sec-butyl 4-methyl-4-pentenoate which distills at 35° to 37° C. at 0.3 mm. absolute pressure. The product has an $n_D^{25}$ value of 1.4253, contains 70.66% carbon (70.54% theoretical) and 10.66% hydrogen (10.66% theoretical).

The product is identified as sec-butyl 4-methyl-4-pentenoate.

EXAMPLE 4

The reaction is run as in Example 3. From 416 grams of sec-butyl 2,4-dimethyl-4-nitropentanoate there is obtained 181 grams of sec-butyl 2,4-dimethyl-4-pentenoate which has a boiling point of 39° C. at 0.2 mm. absolute pressure. The product has an $n_D^{25}$ value of 1.4248, contains 71.66% carbon (71.69% theoretical) and 10.79% hydrogen (10.94% theoretical).

The product is identified as sec-butyl 2,4-dimethyl-4-pentenoate.

EXAMPLE 5

Into a reactor equipped with a thermometer, an agitator and a distillation column, the upper end of which is connected to a Stark-Dean separator and a reflux condenser, is charged 235 grams of octyl 4-methyl-4-nitropentanoate. The ester is a mixture having the approximate composition: 45% 2-octyl, 30% 3-octyl and 25% 4-octyl. The mixture is heated in the range of 218° C. to 230° C. for a period of seven hours, during which time oxides of nitrogen are evolved and a distillate consisting mainly of water is taken overhead. The pressure is reduced to about 2 mm. absolute pressure and the reactor is distilled to dryness.

The distillate is transferred to a separatory funnel and the lower aqueous layer (14 grams) is removed. The organic layer is vacuum distilled to provide as the major fraction 68 grams of octyl 4-methyl-4-pentenoate which distills in the range of 83° to 91° C. at 0.4 mm. absolute pressure. The product has an $n_D^{30}$ value of 1.4350, contains 74.19% carbon (74.28% theoretical) and 11.62% hydrogen (11.58% theoretical).

The product is identified as octyl 4-methyl-4-pentenoate.

EXAMPLE 6

The conversion is effected as in Example 5. From 162 grams of octyl 2,4-dimethyl-4-nitropentanoate (wherein the approximate composition of the octyl group is 45% 2-octyl and 25% 4-octyl), there is obtained 85 grams of octyl 2,4-dimethyl-4-pentenoate, which distills at 94° to 104° C. at 1.0 mm. absolute pressure. The product has an $n_D^{31}$ value of 1.4345, contains 74.84% carbon (74.95% theoretical) and 11.92% hydrogen (11.74% theoretical).

The product is identified as octyl 2,4-dimethyl-4-pentenoate.

EXAMPLE 7

In a reactor equipped with an agitator, a thermometer and a distillation column and head is placed 114 grams of methyl 2-methyl-4-nitro-4-pentamethylenepentanoate. The material is heated at 206° to 230° C. first for two hours at atmospheric pressure and then for two hours at about 50 mm. absolute pressure. During this time, brown fumes are evolved and distillate is taken overhead until the reaction is dry.

The crude organic layer, after removal of the 10 grams lower aqueous phase, is distilled to give 61 grams of the unsaturated ester which distills at 51° to 53° C. at 0.5 mm. absolute pressure. The product has an $n_D^{25}$ value of 1.4673, contains 72.74% carbon (72.49% theoretical) and 9.94% hydrogen (9.96% theoretical).

The product is identified as methyl 4-pentamethylene-3-pentenoate.

EXAMPLE 8

5-methyl-5-nitrohexanone-2 (124 grams) is heated at atmospheric pressure to 220° C. At this point, the material begins to be converted to the product, as indicated by the evolution of oxides of nitrogen and water. The reaction is maintained in the range of 216° to 222° C. for two hours during which time 74 grams of distillate is taken overhead.

The distillate is transferred to a separatory funnel and the aqueous layer (20 grams) is removed. The organic layer is distilled under reduced pressure to give the main fraction 38 grams of 5-methyl 5-hexenone-2, which distills at 54° to 55° C. at 21 mm. absolute pressure. The product has an $n_D^{26}$ value of 1.4275, contains 74.79% carbon (74.95% theoretical) and 10.70% hydrogen (10.78% theoretical).

The product is identified as 5-methyl-5-hexenone-2.

EXAMPLE 9

A mixture of 108 grams of 3-methyl-3-nitro butyl cyanide and 25 grams of tricresyl phosphate is placed in a reactor equipped with an agitator, a thermometer and a distillation column and head. The agitated mixture is heated and at 205° C., a slow evolution of brown fumes starts. Heating in the range of 205° to 232° C. is continued for three hours during which time distillate is taken overhead.

The distillate is transferred to a separatory funnel and the lower aqueous layer is removed. The organic layer is fractionally distilled to provide 46 grams of 3-methylene butyl cyanide which distills at 52° C. at 10 mm. absolute pressure. The product has an $n_D^{26}$ value of 1.4310, contains 75.64% carbon (75.75% theoretical) and 9.54% hydrogen (9.54% theoretical).

The product is identified as 3-methylene butyl cyanide.

EXAMPLE 10

Tributyl-4-nitro-4-(2-carboxyethyl)heptandioate (200 grams) is refluxed for ten hours at about 10 mm. absolute pressure and a pot teperature in the range of 225° to 260° C. During this period, gaseous products are removed through the water pump. The residue is then fractionated to provide as the main cut tributyl-4-(2-carboxyethyl)-4-heptendioate which distills at 180° to 182° C. at 0.15 mm. absolute pressure.

The product has an $n_D^{25}$ value of 1.4575, contains 66.45% carbon (66.30% theoretical) and 9.63% hydrogen (9.61% theoretical).

The product is identified as tributyl 4-(2-carboxyethyl)-4-heptendioate.

EXAMPLE 11

A mixture of 124 grams of dimethyl 4-methyl-4-nitroheptandioate and 25 grams of tricresyl phosphate is charged to a reactor equipped with a thermometer, an agitator and a distillation column and head. The agitated material is heated for six hours at 225° to 250° C. at atmospheric pressure, during which time oxides of nitrogen are evolved and a small amount of distillate (about 15 grams). The pressure is reduced to 20 mm. absolute pressure and distillate is taken overhead until the pot temperature reaches 205° C.

The water layer is removed from the distillate and the organic layer is redistilled to provide 46 grams of dimethyl 4-methylene-heptanedioate which distills at 74° to 76° C. at 0.2 mm. absolute pressure. The product has an $n_D^{25}$ value of 1.4513, contains 59.64% carbon (59.98% theoretical) and 7.82% hydrogen (8.05% theoretical).

The product is identified as dimethyl 4-methylene-heptandioate.

We claim:

1. A method for the preparation of the compound of the formula

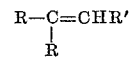

which comprises heating the compound

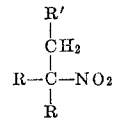

until the evolution of the oxides of nitrogen and water ceases, wherein the temperature range employed as a batch process is about 200° to 240° at atmospheric pressure or on a continuous vapor phase basis is about 300° to 600°, in which R is an alkyl group of 1 to 4 carbon atoms or a group of one of the formulas:

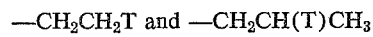

in which T is —CN, or —COOY, in which Y is an an alkyl group of 1 to 12 carbon atoms and R' is hydrogen, an alkyl group of 1 to 3 carbon atoms or a group of one of the formulas:

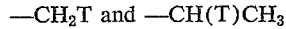

with the proviso that the reactant and final product contain at least one T group and with the further proviso that when more than one T group is present that all of said T groups be identical.

2. The method of claim 1 in which only one of the two —R radicals and the —CH₂R' radical is alkyl.

3. The method of claim 1 in which at least one of the —R and —CH₂R' groups in the nitro compound is 2-cyanoethyl; 2-cyano-2-methylethyl; 2-alkoxycarbonylethyl or 2-alkoxycarbonyl-2-methylethyl, the alkoxy group of which contains 1 to 12 carbon atoms.

4. The method of claim 3 in which the radicals —R and —CH₂R' consist of two alkyl groups and one 2-alkoxycarbonylethyl or one 2-alkoxycarbonyl-2-methylethyl group.

References Cited

Gray et al., Transactions of the Faraday Society, vol. 51, pp. 1489–1497 (1955), TK-1-F25.

Smith, P. A. S., The Chemistry of Open-Chain Organic Nitrogen Compounds, vol. II, p. 398 (1966), QD-412.N1-S6.

JOSEPH PAUL BRUST, Primary Examiner

U.S. Cl. X.R.

260—404, 465.8 R, 465.9, 485 R, 486 R, 561 N, 593 R, 677 R